United States Patent [19]

Markovs et al.

[11] Patent Number: 4,994,502
[45] Date of Patent: Feb. 19, 1991

[54] PROCESS FOR THE PREPARATION OF INTEGRAL SKIN POLYURETHANE STEERING WHEELS

[75] Inventors: Robert A. Markovs; Eric R. Sattler, both of Grosse Ile, Mich.

[73] Assignee: BASF Corporation, Parsippany, N.J.

[21] Appl. No.: 68,918

[22] Filed: Jul. 1, 1987

[51] Int. Cl.$^5$ ............................................. C08L 75/14
[52] U.S. Cl. .................... 521/137; 521/140; 521/159; 521/174; 521/176
[58] Field of Search ............. 521/137, 140, 159, 174, 521/176

[56] References Cited

U.S. PATENT DOCUMENTS

| | | | |
|---|---|---|---|
| 4,104,236 | 8/1978 | Simroth | 521/137 |
| 4,542,166 | 9/1985 | Mabuchi | 521/174 |
| 4,568,705 | 2/1986 | Grace et al. | 521/137 |

Primary Examiner—John Kight, III
Assistant Examiner—Sam A. Acquah
Attorney, Agent, or Firm—Martin P. Connaughton

[57] ABSTRACT

An integral skin polyurethane steering wheel is prepared by reacting (a) a mixture of a graft polymer dispersion in a polyol or a polyol mixture (b) an organic polyisocyanate selected from the group consisting of an isocyanate prepolymer prepared by reacting 4,4'-diphenylmethane diisocyanate with a mixture of dipropylene glycol and a polyoxypropylene glycol having a molecular weight of about 420, a polymeric polymethylene polyphenylene polyisocyanate containing about 55 weight percent diphenylmethane diisocyanate, a 1:1 mixture of 2,4'and 4,4'-diphenylmethane diisocyanate and mixtures thereof, (c) a blowing agent, (d) a chain extender, and (e) a catalyst, surfactant and optionally flame retardants, fillers U.V. adsorbers and other additives.

9 Claims, No Drawings

PROCESS FOR THE PREPARATION OF INTEGRAL SKIN POLYURETHANE STEERING WHEELS

BACKGROUND OF THE INVENTION

1. Field of the Invention

The present invention relates to integral skin polyurethane steering wheels. More particularly, the invention relates to integral skin polyurethane steering wheels prepared from graft polymer dispersions. This process yields foams with improved physical properties as well as improved skin formation, surface appearance and processing characteristics

2. Description of the Prior Art

The prior art generally teaches that graft polymer dispersions in polyols may be employed for a variety of polyurethane products U.S. Pat. No. 4,542,166 teaches that a steering wheel may be produced employing integral skin foam incorporating a polymer polyol and an aliphatic or alicyclic isocyanate in the presence of a polyol having a molecular weight of 62 to 300.

SUMMARY OF THE INVENTION

During the formation of an integral skin foam, the liquid reactant mass must flow smoothly into all mold crevices, rise uniformly without air trapping within the foam and form a finished part with a smooth non-porous, bubble-free surface skin Use of a graft polymer dispersion in a polyol in steering wheel systems improves the flowability of the liquid reactant mass leading to less air bubble trapping in the foam. The finished parts tend to have a better, more uniform skin with less porosity This is important since the better skin and surface of the part result in a better painted surface and thus the rejection rate in production will be lower. Another advantage of the use of graft polymer dispersions lies in the resistance to collapse in the molded pad. In many instances if the mold temperature is not properly maintained, (too cold), the part may form a thick skin without sufficient foam within to support the skin. This can lead to a collapse phenomenon whereby the surface of the part is not perfectly flat but can have a concave indentation. The presence of graft polymer dispersions minimizes this problem and thus a more forgiving system is in effect The isocyanates employed are those which contain diphenylmethane diisocyanate.

DESCRIPTION OF THE PREFERRED EMBODIMENTS

The urethane composition which is employed for integral skin steering wheels consists essentially of the reaction product of (a) a mixture of a graft polymer dispersion in a polyol, or a polyol mixture (b) an organic polyisocyanate selected from the group consisting of an isocyanate prepolymer prepared by reacting 4,4'-diphenylmethane diisocyanate with a mixture of dipropylene glycol and a polyoxypropylene glycol having a molecular weight of about 420, a polymeric polymethylene polyphenylene polyisocyanate containing about 55 weight percent diphenylmethane diisocyanate, a 1:1 mixture of 2,4'- and 4,4'-diphenylmethane diisocyanate and mixtures thereof, (c) a blowing agent, (d) a chain extender, and (e) a catalyst, surfactant and optionally flame retardants, fillers U.V. absorbers and other additives.

The graft polymer dispersions which may be employed are prepared by polymerizing an ethylenically unsaturated monomer or mixture of monomers in either saturated or induced unsaturation polyols. The unsaturated polyols are preferred.

The polyols having induced unsaturation are hereinafter referred to as "macromers." Chain transfer agents may be employed as reaction moderators particularly at temperatures below 105° C. The polymerization reaction may be carried out at temperatures between 25° C. and 180° C., preferably between 80° C. and 135° C. The polyol mixture contains less than 0.1 mole of unsaturation per mole of polyol mixture and ranges from 0.001 to 0.09 mole of unsaturation.

The graft polymer dispersions of this invention have viscosities less than 10,000 cps at 25° C. Preferably they have viscosities ranging from 2000 to 8000 cps at 25° C.

Among those chain transfer agents which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonate, bromotrichloromethane, dibromoethane, diiodomethane, naphthalene, 1- naphthol, 2-naphthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 1,2-propanediol, 3-phosphinopropionitrile, 1-propanol, pyrocatechol, pyrogallol, methyl stearate, tetraethylsilane, triethylsilane, dibromostilbene, α-bromostyrene, α-methylstyrene, tetraphenyl succinonitrile, 2,4,6-trinitrotoluene, p-toluidine, N,N-dimethyl-p-toluidine, α-cyano-p-tolunitrile, α,α'-dibromo-p-xylene, 2,6-xylenol, diethyl zinc, dithiodiacetic acid, ethyl dithiodiacetic acid, 4,4'-dithio-bisanthranilic acid, benzenethiol, o-ethoxybenzenethiol, 2,2'-dithiobisbenzothiazole, benzyl sulfide, 1-dodecanethiol, ethanethiol, 1-hexanethiol, 1-napthalenethiol, 2-napthalenethiol, 1-octanethiol, 1-heptanethiol, 2-octanethiol, 1-tetradecanethiol, α-toluenethiol, isopropanol, 2-butanol, carbon tetrabromide and tertiary dodecyl mercaptan.

The chain transfer agents employed will depend on the particular monomers or mixtures of monomers employed and the molar ratios of such mixtures. The concentration of the chain transfer agent which is employed may range from 0.1 to 10 percent by weight based on the weight of monomer.

Representative polyols essentially free from ethylenic unsaturation which may be employed in the invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, equivalent weight of the polyols will vary from 100 to 10,000, preferably from 1000 to 3000.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides The polyoxyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 5000

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms A more comprehensive discussion of these polyols and their method of preparation can be found in U.S. Pat. Nos. 3,585,185; 3,639,541 and 3,639,542.

The unsaturated plyols or macromers which are employed in the present invention may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol Representative of such organic compounds include unsaturated mono- and polycarboxylic acids and anhydrides such as maleic acid and anhydride, fumaric acid, crotonic acid and anhydride, propenyl succinic anhydride, acrylic acid, acryoyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinyl-cyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether) If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

In the event maleated macromers are employed, they may be isomerized at temperatures ranging from 80° C to 120° C for one-half hour to three hours in the presence of an effective amount of an isomerization catalyst The catalyst is employed at concentrations greater than 0.01 weight percent based on the weight of the macromer.

When preparing the polyetherester polyol employing the catalyst selected from the group consisting of salts and oxides of divalent metals, the concentration of catalyst which may be employed ranges from 0.005 to 0.5 weight percent based on the weight of polyol mixture The temperatures employed range from 75° C. to 175° C. The equivalent weight of the macromer may vary from 1000 to 10,000, preferably from 2000 to 6000.

Among the divalent metals which may be employed are: zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, and manganese acetate.

Certain of the above-mentioned catalysts such as calcium naphthenate promote the isomerization of the maleate to the fumarate structure during the preparation of the macromer, while others such as zinc chloride, which is an effective catalyst for the polymerization, inhibit this isomerization.

As mentioned above, the graft polymer dispersions of the invention are prepared by the in situ polymerization, in the above-described polyols of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl pyrrole,and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof The amount of ethylenically unsaturated monomer employed in the polymerization reaction is generally from 25 percent to 60 percent, preferably from 30 percent to 45 percent, based on the total weight of the product. The polymerization occurs at a temperature between about 25° C. and 180° C., preferably from 80° C. to 135° C.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide,diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2-methyl heptonitrile), 1,1'-azo-bis(cyclohexane carbonitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane,2,2'-azobis2-methylbutanenitrile, 2-t-butylazo-2-cyanobutane, 1-t-amylazo-1-cyanocyclohexane, 2,2'-azobis(2,4-dimethyl-4-methoxyvaleronitrile, 2,2'-azobis-2-methylbutyronitrile, 2-t-butylazo-2-cyano-4-methylpentane, 2-t-butylazo-2-isobutyronitrile, to butylperoxyisopropyl carbonate and the like; a mixture of initiators may also be used. The preferred initiators are 2,2'-azobis(2-methylbutyronitrile), 2,2'-azobis(isobutyronitrile), 2,2'-azobis(2,4-dimethylvaleronitrile), 2-t-butylazo-2-cyano-4-methoxy-4-methylpentane, 2-t-butylazo-2-cyano-4-methylpentane, 2-t-butylazo2-cyano-butane and lauroyl peroxide Generally, from about 0.1 percent to about 10 percent, preferably from about 1 percent to about 4 percent, by weight of initator based on the weight of the monomer will be employed in the process of the invention.

The integral skin polyurethane foams employed in the present invention are generally prepared by the reaction of a graft polymer dispersion with an organic polyisocyanate in the presence of a blowing agent and optionally in the presence of additional polyhydroxyl-containing components, chain-extending agents, catalysts, surface-active agents, stabilizers, dyes, fillers and pigments Suitable processes for the preparation of cellular polyurethane plastics are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane-. diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyl-diphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

As mentioned above, the graft polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may be employed in the preparation of the polyurethane foams include those compounds having at least two functional groups-bearing active hydrogen atoms such as water, hydrazine, primary and secondary diamines, amino alcohols, amino acids, hydroxy acids, glycols, or mixtures thereof A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride,dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

Among the flame retardants which may be employed are: pentabromodiphenyl oxide, dibromopropanol, tris($\beta$-chloropropyl)phosphate, 2,2-bis(bromoethyl) 1,3-propanediol, tetrakis(2-chloroethyl)ethylene diphosphate, tris(2,3-dibromopropyl)phosphate, tris($\beta$-chloroethyl)phoshate, tris(1,2-dichloropropyl)phosphate, bis-(2-chloroethyl) 2-chloroethylphosphonate, molybdenum trioxide, ammonium molybdate, ammonium phosphate, pentabromodiphenyloxide, tricresyl phosphate, hexabromocyclododecane and dibromoethyl-dibromocyclohexane. The concentrations of flame retardant compounds which may be employed range from 5 to 25 parts per 100 parts of polyol mixture.

Ultraviolet absorbers may also be employed. These include benzotriazoles such as Tinuvin P, Tinuvin 327 and Tinuvin 328 produced by Ciba-Geigy Corporation, benzophenols such as Tomisopl 800 produced by Yashitomi Pharmaceutical Industries, Ltd. and hindered amines such as Sanol LS-770, Sanol LS-744 and Tinuvin 144, Ciba-Geigy Corporation.

Polyol A is an ethylene oxide propylene oxide adduct of trimethylolpropane containing 13 percent ethylene oxide and having a hydroxyl number of about 35.

Polyol B is Polyol A containing a 31 weight percent 1:1 acrylonitrile:styrene polymer dispersion having a hydroxyl number of about 24.

DABCO S-25 is a 25 weight percent solution of triethylenediamine in butanediol.

Fomrez UL-1 is a metal catalyst sold by Witco Chemical Corporation.

F-11A is a fluorocarbon blowing agent sold by duPont Corporation.

I-460 is similar to DABCO S-25.

BDO is 1,4-butanediol.

Isocyanate A is 60 percent isocyanate prepolymer prepared by reacting 4,4'-diphenylmethane diisocyanate with a mixture of dipropylene glycol and a polyoxypropylene glycol, molecular weight 420, 20 percent polymeric polymethylene polyphenylene polyisocyanate containing about 55 percent two-ring and 20 percent of a 1:1 mixture of 2,4'- and 4,4'-diphenylmethane diisocyanate. Isocyanate B is an isocyanate prepolymer prepared by reacting 4,4'-diphenylmethane diisocyanate with a mixture of dipropylene glycol and a polyoxypropylene glycol having a molecular weight of about 420.

EXAMPLES 1-5

Procedure

The indicated quantities of the ingredients employed were blended together at room temperature and poured into steering wheel molds. The molds were closed and after the reaction had been completed, the finished steering wheel were removed from the molds. The wheels prepared employing a graft polymer dispersion had improved skin formation and improved surface appearance.

TABLE I

| Examples | 1 | 2 | 3 | 4 | 5 |
|---|---|---|---|---|---|
| Formulation, pbw | | | | | |
| Polyol A | 82.6 | 57.6 | 41.3 | 57.6 | 41.3 |
| Polyol B | — | 25.0 | 41.3 | 25.0 | 41.3 |
| BDO | 5.6 | 5.6 | 5.6 | 5.6 | 5.6 |
| Glycerin | 0.4 | 0.4 | 0.4 | 0.4 | 0.4 |
| DABCO S-25 (I-460) | 1.9 | 1.9 | 1.9 | 1.9 | 1.9 |
| Fomrez UL-1 | 0.002 | 0.002 | 0.002 | 0.002 | 0.002 |
| H$_2$O | 0.05 | 0.05 | 0.05 | 0.05 | 0.05 |
| F-11A | 9.5 | 9.5 | 9.5 | 9.5 | 9.5 |
| Isocyanate A/100 parts resin | 37.0 | 35.5 | 35.0 | | |
| Isocyanate B/100 parts resin | | | | 40.9 | 40.4 |
| Physical Properties | | | | | |
| Tensile (kPa) | 1241 | 1575 | 2135 | 2661 | 3142 |
| Elongation (%) | 110 | 105.5 | 120 | 160.5 | 149.0 |
| Split Tear (N/M) | 2802 | 2329 | 2486 | 3660 | 4132 |
| Density (Kg/M$^3$) | 485 | 564 | 572 | 545 | 559 |
| ILD (kg) | | | | | |
| 25% | — | 17.2 | 24.7 | 32.0 | 37.9 |
| 65% | — | 83.2 | 106.6 | 123.8 | 178.9 |
| 25% Return | — | 11.3 | 14.5 | 17.5 | 19.5 |
| Sag Factor | — | 4.8 | 4.3 | 3.8 | 4.7 |
| % Recovery | — | 4.8 | 4.3 | | |
| CLD (kPa) | | | | | |
| 25% | 57.9 | 195.1 | 293 | 324.8 | 400.6 |
| 50% | 101.4 | 809.5 | 1126 | 1415.5 | 1708.6 |
| 25% Return | — | 148.2 | 176 | 186.9 | 221 |
| Compression Set (%) @ 50% 22 hrs., 69° C. | — | 18.4 | 18.2 | 26.5 | 26.6 |
| Shore A | 47–45 | 50–44 | 57–50 | 64–59 | 73–67 |

The embodiments of the invention in which an exclusive privilege or property is claimed are defined as follows:

1. A urethane composition consisting essentially of the reaction product of
   (a) a mixture of a graft polymer dispersion in a polyol or a polyol mixture,
   (b) an organic polyisocyanate selected from the group consisting of an isocyanate prepolymer prepared by reacting 4,4'-diphenylmethane diisocyanate with a mixture of dipropylene glycol and a polyoxypropylene glycol having a molecular weight of about 420, a polymeric polymethylene polyphenylene polyisocyanate containing about 55 weight percent diphenylmethane diisocyanate, a 1:1 mixture of 2,4'- and 4,4'-diphenylmethane diisocyanate and mixtures thereof,
   (c) a blowing agent,
   (d) a chain extender, and
   (e) a catalyst, surfactant and optionally flame retardants, fillers, and ultraviolet absorbers.

2. The composition of claim 1 wherein the graft polymer dispersion in a polyol consists of about a 1:1, 30 percent dispersion of acrylonitrile:styrene in an ethylene oxide propylene oxide adduct of trimethylolpropane containing about 13 percent ethylene oxide and having a hydroxyl number of about 35.

3. The composition of claim 1 wherein the polyol is an ethylene oxide propylene oxide adduct of trimethylolpropane containing about 13 percent ethylene oxide and having a hydroxyl number of about 35.

4. An integral skin steering wheel consisting essentially of the reaction product of
   (a) a mixture of a graft polymer dispersion in a polyol or a polyol mixture,
   (b) an organic polyisocyanate selected from the group consisting of an isocyanate prepolymer prepared by reacting 4,4'-diphenylmethane diisocyanate with a mixture of dipropylene glycol and a polyoxypropylene glycol having a molecular weight of about 420, a polymeric polymethylene polyphenylene polyisocyanate containing about 55 weight percent diphenylmethane diisocyanate, a 1:1 mixture of 2,4'- and 4,4'-diphenylmethane diisocyanate and mixtures thereof,
(c) a blowing agent,
(d) a chain extender, and
(e) a catalyst, surfactant and optionally flame retardants, fillers, and ultraviolet absorbers.

5. The steering wheel of claim 4 wherein the graft polymer dispersion in a polyol consists of about a 1, 30 percent dispersion of acrylonitrile:styrene in an ethylene oxide propylene oxide adduct of trimethylolpropane containing about 13 percent ethylene oxide and having a hydroxyl number of about 35.

6. The steering wheel of claim 4 wherein the polyol is an ethylene oxide propylene oxide adduct of trimethylolpropane containing about 13 percent ethylene oxide and having a hydroxyl number of about 35.

7. A process for the preparation of an integral skin steering wheel wherein a urethane composition consisting essentially of the reaction product of
(a) a mixture of a graft polymer dispersion in a polyol or a polyol mixture,
(b) an organic polyisocyanate selected from the group consisting of an isocyanate prepolymer prepared by reacting 4,4'-diphenylmethane diisocyanate with a mixture of dipropylene glycol and a polyoxypropylene glycol having a molecular weight of about 420, a polymeric polymethylene polyphenylene polyisocyanate containing about 55 weight percent diphenylmethane diisocyanate, a 1:1 mixture of 2,4'- and 4,4'-diphenylmethane diisocyanate and mixtures thereof,
(c) a blowing agent,
(d) a chain extender, and
(e) a catalyst, surfactant and optionally flame retardants, fillers, and ultraviolet absorbers,
is poured into a mold, said mold at temperatures ranging from 25° C. to 100° C., the mold is closed, and upon completion of the reaction, said steering wheel is removed from said mold.

8. The process of claim 7 wherein the graft polymer dispersion in a polyol consists of about a 1:1, 30 percent dispersion of acrylonitrile:styrene in an ethylene oxide propylene oxide adduct of trimethylolpropane containing about 13 percent ethylene oxide and having a hydroxyl number of about 35.

9. The process of claim 7 wherein the polyol is an ethylene oxide propylene oxide adduct of trimethylolpropane containing about 13 percent ethylene oxide and having a hydroxyl number of about 35.

* * * * *